Nov. 17, 1936.    G. R. SPANGENBERGER    2,061,174
WATER HEATING
Filed May 10, 1935    2 Sheets-Sheet 1
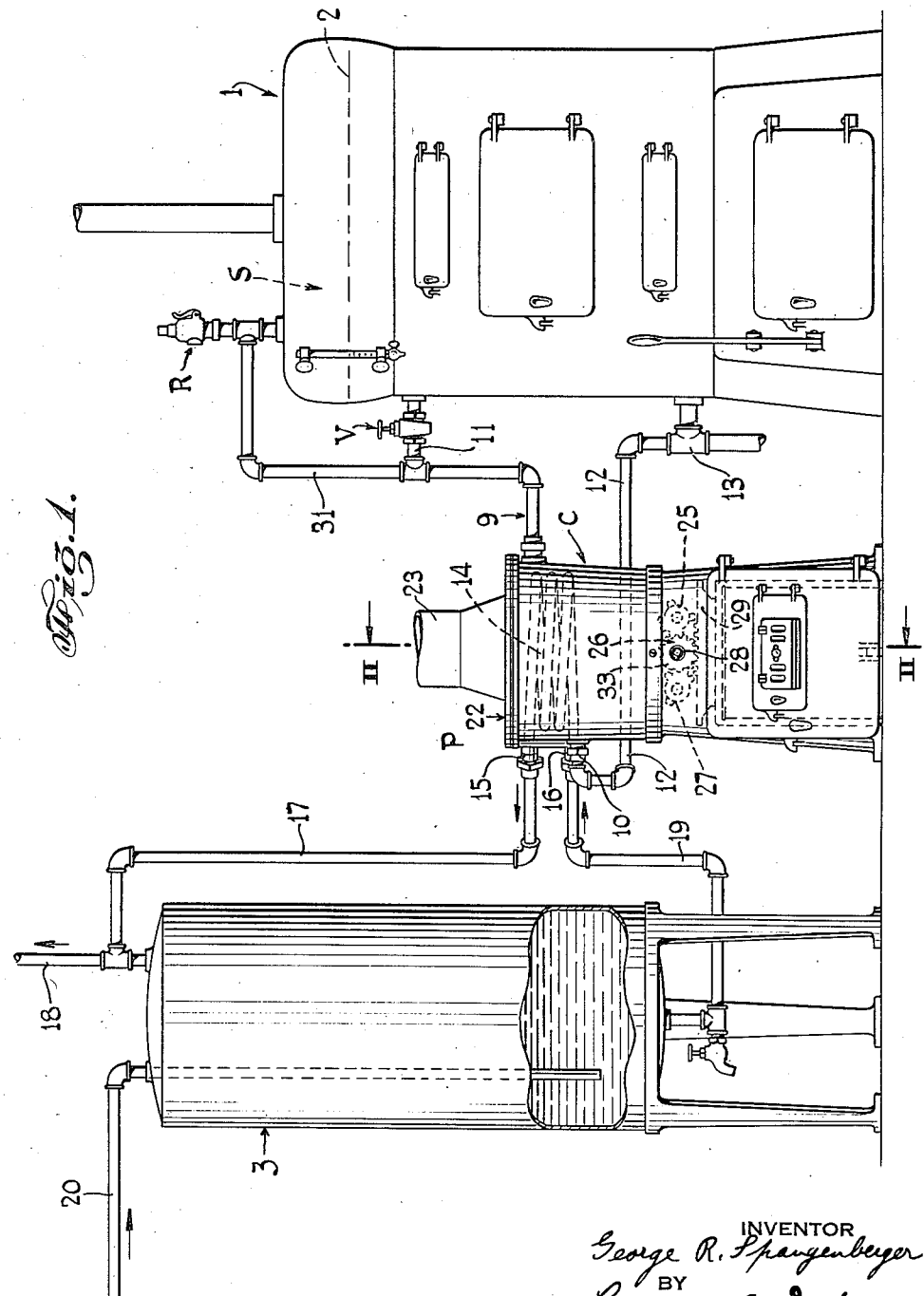
INVENTOR
George R. Spangenberger
BY
Lyman E. Lodge
ATTORNEY Nov. 17, 1936.    G. R. SPANGENBERGER    2,061,174
WATER HEATING
Filed May 10, 1935    2 Sheets-Sheet 2
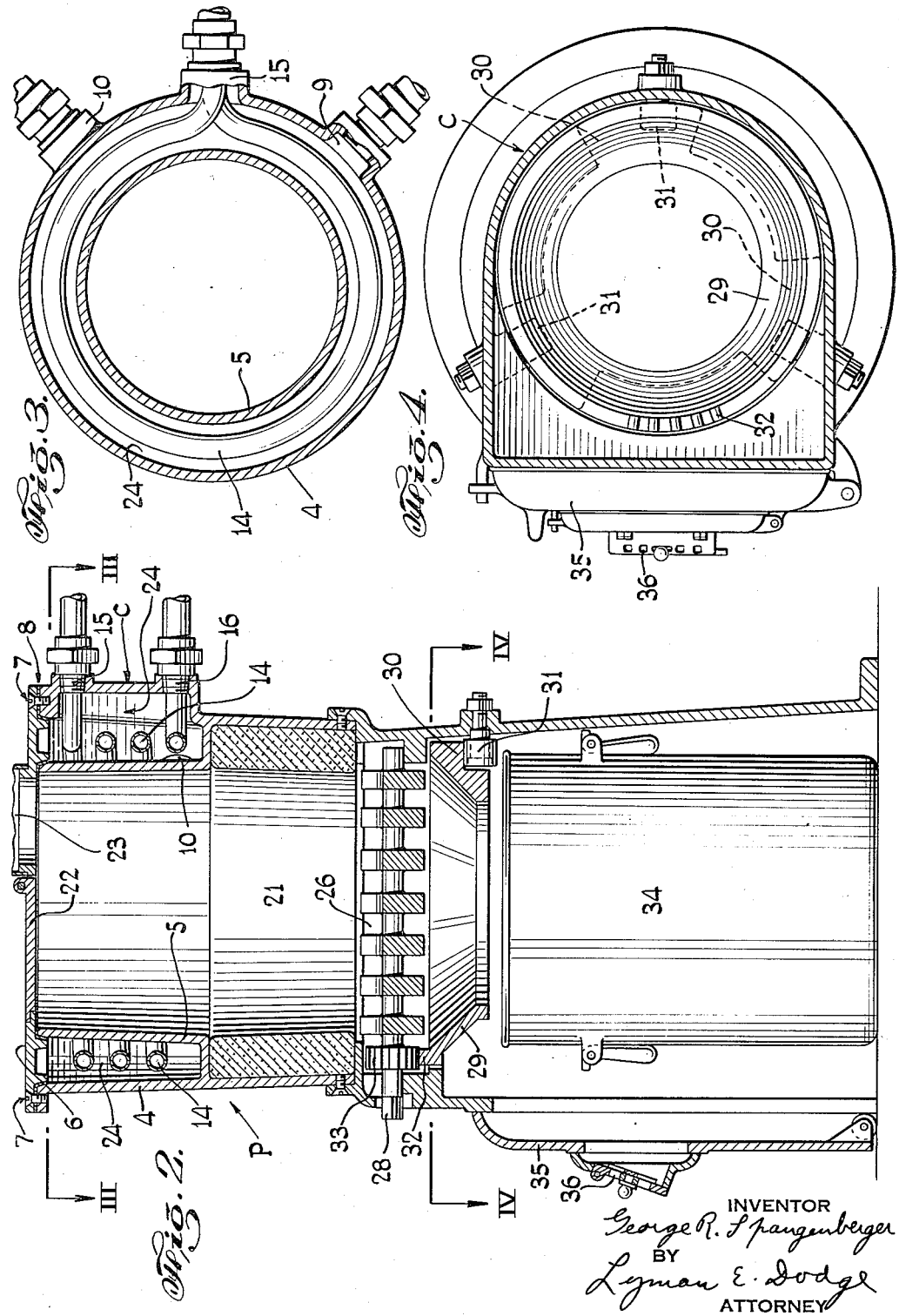

Patented Nov. 17, 1936

2,061,174

UNITED STATES PATENT OFFICE 2,061,174

WATER HEATING

George R. Spangenberger, Newark, N. J.

Application May 10, 1935, Serial No. 20,763

1 Claim. (Cl. 122—32)

This invention relates to heating, particularly to heating of water, and more especially the heating of water for use in a building such as an ordinary residence.

It is well known that many residences are provided with a means for heating water which is circulated in pipes about the house connected with outlets at convenient places.

Many arrangements have been devised for most conveniently and economically heating water for domestic purposes. A common method is to provide a storage tank in the kitchen, and connect that storage tank with what is known as a "water back" attached to the ordinary household cooking range. A second method is to provide a like storage tank and connect it with a coiled pipe heated by means of oil or gas. A third method is to place a heating coil in the house heating appliance in the cellar and connect that heating coil with a storage tank. A fourth method is to provide a separate heating device in the cellar, commonly known as a pot stove and to connect this with a storage tank. A fifth method is to provide an electrical device attached to a water outlet so arranged that the opening of the outlet causes the electrical device to instantly heat the water so that the water issuing therefrom is at the proper temperature.

Although the above are the principal methods, there are other methods which are used, but all of the methods have certain disadvantages in that a radical change must, in general, be made between the summer and the winter heating, or else a water heating method separate and independent from any of the other heating arrangements of the house must be used.

A principal object of this invention is to provide an arrangement of connections between the body of water in a house heating boiler and an annular chamber within which is disposed a hollow body for heating water for a domestic water supply, which will insure the absence of the formation of steam which will be projected at times into the house heating boiler to be followed by a return of an equal volume of water, thereby creating a temporary disturbance.

A cognate object of the invention is to provide such controlling arrangements for the circulatory connections included in the system that in the event of a generation of steam, by reason of a careless firing by persons not conversant with the technical niceties of operating such heating systems, the additional pressure thus generated may be relieved through the conventional safety valve of the steam heating system, without endangering the integrity of the latter; and a concomitant effect of providing the controlling means disclosed herein is the very desirable feature that the circulatory system will not be deprived of feed water at any time, in spite of any boiling off in the formation of steam, and no matter how low the level of water may fall in the boiler of the house heating appliance.

It is to be noted that it is desirable, in general, to take advantage of the house heating system for heating the domestic hot water supply because such use is a satisfactorily economical expedient. This generally has resulted, however, in having two entirely separate and different methods of heating the supply for the several seasons, and has involved considerable complexity in changing from one method to the other; such a change being in fact somewhat beyond the experience of the average household.

Other objects and advantages will appear as the description of the particular physical embodiment selected to illustrate the invention progresses, and the novel features will be particularly pointed out in the appended claim.

In describing the invention in detail, and the particular physical embodiment selected to illustrate the invention reference will be had to the accompanying drawings and the several views therein, in which like characters of reference designate like parts throughout the several views, and in which:

Fig. 1 is a somewhat diagrammatic illustration of a system for supplying hot water arranged in accordance with applicant's invention; Fig. 2 is a sectional view of a device illustrated in Fig. 1, on the plane indicated by the line II—II of Fig. 1 viewed in the direction of the arrows at the ends of the line; Fig. 3 is a horizontal sectional view of the device as shown by Fig. 2 on the plane indicated by the line III—III of Fig. 2, viewed in the direction of the arrows at the ends of the line; Fig. 4 is a horizontal sectional view of the device as shown by Fig. 2 on the plane indicated by the line IV—IV of Fig. 2, viewed in the direction of the arrows at the ends of the line.

Numeral 1 designates a conventional house heating device in this instance forming part of a conventional "steam-heating" system, which makes use of water which is always present therein, up to at least the line 2. 3 designates an ordinary and well known and conventional hot water storage tank such as is commonly used in residences.

P designates, as a whole, a device somewhat similar to an ordinary pot furnace designated by me as a supplementary heating unit.

In general, applicant's system is such that when the house heating unit 1 is being operated, the storage tank 3 is supplied with hot water by reason of the heat generated by the device 1. When the device 1 is not in operation the hot water supply to storage tank 3 is furnished with the necessary heat by the supplementary heating device P. The only change required from one to the other is the operation of a valve V, and the presence or absence of a burning heating material in the device P.

The device P is shown best in Fig. 2. The device embodies a chamber C formed by walls 4, 5 and 6. The walls are preferably cast integral except the top wall 6 which is removable and is attached to the other walls by means of screw fastenings, such as screws 7. In order to make the joint water tight, applicant, in accordance with the usual custom, inserts gasket 8 between the parts.

The chamber C is formed with outlet openings 9 and 10, best shown in Fig. 3. The outlet opening 9 is connected by means of the pipe 11 (see Fig. 1) through valve V to the body of water in the boiler 1, and the outlet opening 10 is also connected by means of pipe 12 through pipe 13 to the body of water in the boiler 1.

By the arrangement just described, the chamber C is in communication with and filled by the body of water in the boiler 1 so that when the water in the boiler 1 is heated the water in the chamber C is heated.

Positioned in the chamber C is a means for holding and allowing circulation of water, that is, in the form shown, the coil pipe 14. This coil pipe has its ends connected, one to the outlet 15, the other to the inlet 16. The outlet 15 connects by pipe 17 to the top of the storage tank 3 and to the pipe 18 leading to the hot water outlets, conveniently located. The outlet 16 connects with the pipe 19 and to the bottom of the storage tank 3.

The means by which applicant accomplishes the principal object of his invention, already stated in the opening paragraphs of the specification, is to have the lower connections 13, 12, and 10 to the annular space C always open from the house heating boiler 1 but to have the top connection 9 provided with two branches, one branch 11 going to the upper portion of the body of water in the house heating boiler, the other branch 31 going to the steam space S of the house heating boiler 1 or to any point above such steam space. R designates the usual "safety valve" by which undue steam pressure in the space S is relieved when necessary, and the valve V, already mentioned, may be manipulated at will to open or close the connection to the upper portion of the water in the house heating boiler, without affecting the branch connection 31.

When the house heating boiler 1 is being used for the purpose of heating the house, the valve V will be open. Under these conditions, if the water in the annular space is excessively heated even to the point of generating steam, there will always be water entering the lower portion of the annular space C to fill up the space occupied by any steam which may be formed and which escapes into the house heating boiler by means of the upper connection 31, so that there will be at no time, practically, a vacuum formed in the annular chamber C or its connections, for the reason that the lower connections 10, 11, 12, and 13 will always be open between the body of water in the house heating boiler 1 and the annular space C.

In case the house heating boiler is not used, then the valve V in the branch 11 will be closed. Under such conditions, should any steam form in the annular space C, it will be carried to above the water line 2 of the house heating boiler 1, but there will be no moment when the annular space C will not be filled with water, because it is permanently connected by the open pipes 12, 13 to the lower end of the house heating boiler.

In case it is desired to operate in the supplementary heating device P while the boiler 1 is in operation so as to increase the temperature of the water in the chamber C, it would be well to manipulate the valve V in such a way that the freedom of circulation is somewhat curtailed, so that the fuel used in the supplementary heater P would not have its heat largely used in heating the water in the chamber C to be rapidly circulated through the boiler 1.

Another advantage of this form of connection is that if one connects the particular form of domestic hot water supply apparatus as illustrated in this case with a house heating boiler he will not get into any trouble. When that connection is made, it is necessary to drain the water out of the house heating boiler. After all connections are made, even if the valve V in the upper branch 11 is closed, when the house heating boiler is filled with water the water will flow into the annular space C because the air can escape therefrom by means of the upper branch 31 which goes to the steam space S above the water in the house heating boiler.

A supply or source of water is connected to the storage tank 3 by the pipe 20.

It should now be seen that if the water in the boiler 1 is heated, the water in the chamber C will be heated, and will transmit its heat to water in the coil 14, and this water upon being heated will circulate in the well known manner so as to fill the storage tank 3 with heated water. If any water is run off through the pipe 18, it is replenished by water from the source through the pipe 20.

This method enables a householder to take full advantage of the house heating boiler 1 to provide a supply of hot water for domestic purposes, and to do this without the use of any mechanical appliances attached to the boiler other than the pipes 12 and 13.

When the boiler 1 is not in use for heating, the water in the chamber C is heated by fuel of any kind burned in the fire box 21 of the supplementary heating unit P. In the particular arrangement shown, it is contemplated that solid fuel will be used so that a firing door 22 is hinged to the top of the supplementary heating unit P through which fuel may be introduced into the fire box 21 which upon burning has the gases and smoke led off by means of the smoke pipe 23, but in burning transmits heat to the walls of the chamber C and so heats the water 24 therein which in turn heats the water in the coil 14.

When the boiler 1 is not in use for house heating purposes the valve V is closed shutting off upper communication between the boiler 1 and the chamber C, except for the connection 31 above water level 2, and still leaving the lower connection 12 complete so that the chamber C is filled with water from the boiler 1. This is all that is necessary to transform from so called winter heating to summer heating, except the building and maintaining of a fire in the fire box 21 of the supplementary heating unit P.

Applicant's supplementary heating unit P is provided with a grate of conventional form composed of three rotatable sections 25, 26, and 27 which may be oscillated in the well known manner by the use of a crank on the squared end of the shaft 28. In addition to oscillating the grate by the crank on the squared end of shaft 28 an ash deflector 29 is also operated. This ash deflector is substantially in the form of the inverted frustum of a cone and is provided with bearing surfaces, such as 30, resting on supporting rolls, such as 31 and is provided on its upper edge for a short distance with teeth 32 meshing with the teeth of a gear wheel 33 positioned on shaft 28. The shaking of the grate also causes an oscillation of the ash deflector 29 so that the ashes protruding from the lower part of the grate are somewhat agitated and deflected into an ash can 34.

The lower portion of the supplementary heating unit P is provided with a large swinging ash can door 35 which when open allows the removal of the ash can 34 and is further provided with the ordinary and conventional lower draft door 36 which may be suitably manipulated to properly control the burning of the fuel in the fire box 21.

From the hereinbefore given description it is apparent that applicant has provided an arrangement by which full use may be made of the ordinary house heating boiler to provide and supply hot water for the house, but when the boiler is not in use for heating purposes, the hot water for the house may be supplied by a supplementary heating device which may be put into operation by a minimum of manipulations as it involves merely the closing of one valve and burning of fuel in a conventional manner.

Although I have illustrated and described one particular physical embodiment of my invention and explained the principle, construction, and mode of operation thereof, nevertheless, I desire to have it understood that the form selected is merely illustrative, but does not exhaust the possible physical embodiments of the idea of means underlying my invention.

This application is a continuation in part of my copending application Serial No. 685,524, filed August 17, 1933, for water heating.

What I claim as new and desire to secure by Letters Patent of the United States, is:

In a hot water supply system, in combination: a container having a water space adapted to contain a body of water adapted to generate steam and a steam space above the water space, and means to heat said body of water and to supply water thereto; a supplementary heater, including a water space having its top wall at a lower level than the upper water line of the water in said container and including means to heat the water therein, a storage tank for heated water, a water supply through which water is supplied to said storage tank; a heated water delivery conduit leading from the tank; a hollow body disposed within the supplementary water space; upper and lower conduits connecting respectively the upper portion of the said hollow body with the upper portion of said storage tank and the lower portion of said hollow body with the lower portion of the storage tank whereby water in said storage tank is heated by the water in the water space of said supplementary heater; upper and lower conduits connecting respectively the upper portion of the supplementary water space with the upper portion of the container water space and the lower portion of the supplementary water space with the lower portion of the container water space whereby the supplementary water space is always completely filled with water, and a manually operable valve in the upper conduit, and a conduit leading from the supplementary water heater side of the said valve to the steam space above the water space in the container whereby when the valve is open there is a free circulation between the respective water spaces so that any pressure developed in the supplementary heater water space is relieved by the container body of water and when the valve is closed the supplementary heater water space is supplied with water from the container water space and any pressure developed in the supplementary water space is relieved by the connection to the steam space above the water space in the container.

GEORGE R. SPANGENBERGER.